(12) United States Patent
MacLeod

(10) Patent No.: US 6,204,996 B1
(45) Date of Patent: Mar. 20, 2001

(54) LOW PROFILE SPINDLE MOTOR

(75) Inventor: Donald James MacLeod, Santa Cruz, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 08/400,320

(22) Filed: Feb. 27, 1995

Related U.S. Application Data

(63) Continuation of application No. 08/171,881, filed on Dec. 21, 1993, now abandoned, which is a continuation of application No. 07/962,427, filed on Oct. 16, 1992, now abandoned.

(51) Int. Cl.$^7$ .................................................. G11B 17/02
(52) U.S. Cl. .................................................... 360/99.08
(58) Field of Search ............................. 360/98.08, 98.07, 360/99.08, 99.07, 99.04; 439/77; 310/71, 67 R

(56) References Cited

U.S. PATENT DOCUMENTS

| | | | |
|---|---|---|---|
| 4,556,969 | * 12/1985 | Treseder et al. | 360/97.03 |
| 4,858,044 | * 8/1989 | Crapo | 360/99.08 |
| 4,870,703 | * 9/1989 | Augeri et al. | 360/98.07 |
| 4,923,406 | * 5/1990 | Bucknam | 361/398 |
| 4,961,017 | * 10/1990 | Kakinoki et al. | 310/71 |
| 5,001,581 | * 3/1991 | Elsasser et al. | 360/99.08 X |
| 5,013,947 | * 5/1991 | Ide | 310/67 R |
| 5,015,893 | * 5/1991 | Shiozawa | 360/98.07 |
| 5,023,734 | * 6/1991 | Tamaki | 310/71 X |
| 5,064,377 | * 11/1991 | Wood | 439/77 |
| 5,138,209 | * 8/1992 | Chuta et al. | 310/67 R |
| 5,142,173 | * 8/1992 | Konno et al. | 360/98.07 |
| 5,214,326 | * 5/1993 | Yonei | 360/98.08 |
| 5,227,686 | * 7/1993 | Ogawa | 360/99.08 |
| 5,256,922 | * 10/1993 | Tanaka et al. | 310/71 |
| 5,268,604 | * 12/1993 | Katakura | 310/71 |
| 5,295,028 | * 3/1994 | Elsing | 360/99.08 |

* cited by examiner

Primary Examiner—William R. Korzuch
(74) Attorney, Agent, or Firm—Edward P. Heller, III

(57) ABSTRACT

A low-profile spindle motor for a disc drive data storage device includes a cylindrical sleeve which is used to mount the motor to a housing base using press-fitting or adhesive bonding, thus eliminating the vertical height required by screws, bolts or other prior art mounting mechanisms. The same cylindrical sleeve is used to mount the stator stack of the motor, and, on the inner surface of the cylindrical sleeve, to mount the ball bearing assemblies used to allow rotation of a central shaft and attached disc-mounting hub. In another aspect of the invention, ball bearing assemblies having a sealing element on only one side are used to allow greater separation between the ball bearing assemblies, while maintaining a low-profile motor. In yet another aspect of the invention, signals to drive the motor are directed to the stator windings via a printed circuit cable whose termination pads are disposed in the vertical space between adjacent stator windings.

5 Claims, 3 Drawing Sheets

LOW PROFILE SPINDLE MOTOR

This is a continuation of application Ser. No. 08/171,881, filed Dec. 21, 1993, now abandoned, which is a continuation of Ser. No. 07/962,427 filed Oct. 16, 1992, now abandoned.

BACKGROUND OF THE INVENTION

1. Field of the Invention

This invention relates generally to the field of rigid disc data storage devices, and more particularly, but not by way of limitation, to a low profile structure for a spindle motor used to rotate the discs on which data is stored.

2. Brief Description of the Prior Art

Disc drives of the type referred to as "Winchester" disc drives are well known in the industry. Such disc drives typically use one or more rigid discs coated with a magnetic medium for the storage of digital data. These discs are mounted for rotation at a constant speed on a brushless dc spindle motor whose speed is carefully controlled by digital electronics.

Demands of the market and advances in technology have lead to the reduction in the physical size of rigid disc drives from the original fourteen inch outside diameter (O.D.) discs to drives utilizing 2.5", 1.8" and 1.3" O.D. discs, with inner diameters (I.D.) of 20 mm, 12 mm, and 10 mm, respectively. As the diameter of the discs themselves has been reduced, so too has the relative height of the disc drives. Current models of 2.5" disc drives, for instance, have been introduced with overall heights of only 12.5 mm.

Such considerations have lead to the development of the present invention, which provides a spindle motor for such a low-profile disc drive.

SUMMARY OF THE INVENTION

The present invention defines a spindle motor which is of minimal vertical height, while still providing adequate "stiffness" to reliably rotate the discs in a disc drive data storage device. One aspect of the invention which contributes to the overall reduction in size is that the motor of the present invention is intended to be either press-fitted or adhesively bonded into an opening in the base member of the disc drive housing, thus eliminating the need for a mounting flange and screws, which would add to the vertical height if present. A second aspect of the invention is that the motor of the present invention is intended to make use of the maximum available portion of the overall disc drive height, to provide maximum spacing between a pair of ball bearings which allow the rotation of the discs, to cause maximum "stiffness" of the motor. This minimizes wobble or "non-repeatable run-out" (NRR) of the discs mounted to the motor. A third aspect of the invention involves the use of specially configured ball bearings, which have a seal on only one side of the bearing structure, thus contributing to an increase in the center-to-center spacing between the bearings, and adding to the stability of the motor. A fourth aspect of the invention pertains to the method used to connect externally generated motor drive signals to the ends of the motor stator windings, to further reduce overall motor height. A fifth aspect of the present invention provides a motor which is easy and inexpensive to manufacture due to a minimum number of parts which make up the motor.

It is an object of the present invention to provide a low-profile spindle motor for a disc drive data storage device.

It is another object of the present invention to provide a low-profile spindle motor for a disc drive data storage device which has adequate separation between the ball bearings to ensure reliable rotation of the discs.

It is another object of the present invention to provide a low-profile spindle motor for a disc drive data storage device which has a minimal number of parts to allow ease of assembly and reduced manufacturing costs.

It is another object of the present invention to provide a low-profile spindle motor for a disc drive data storage device which has favorable performance characteristics over a wide range of ambient operating temperatures.

These aspects of the motor of the present invention along with other features and benefits can best be understood by reading the following detailed description of the invention in conjunction with the drawings.

DETAILED DESCRIPTION OF THE INVENTION

Figure 1:
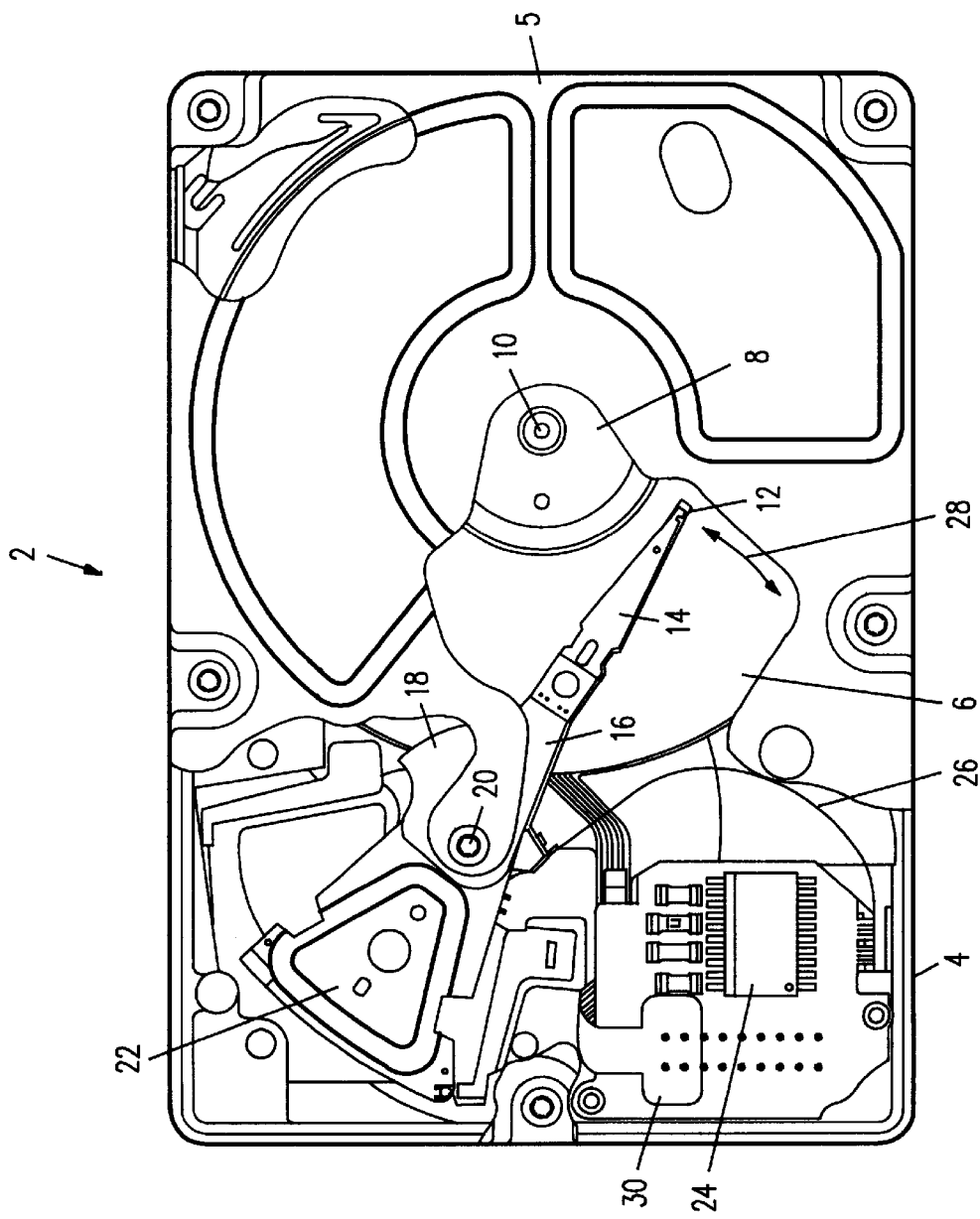
FIG. 1 is a top view with a partial cutaway which shows a disc drive data storage device in which the spindle motor of the present invention is particularly useful.

Referring now to the drawings and in particular FIG. 1, shown is a disc drive 2 which includes a base member 4 and a top cover 5 which comprise the sealed housing to which all other elements of the disc drive are mounted. A disc 6 is mounted to a spindle motor (not shown) using a spring clamp 8 and a central screw 10. A read/write head 12 is mounted via a flexure 14 to a head mounting arm 16 which is part of an actuator body 18. The actuator body 18 is adapted for rotation about a pivot shaft 20 by a voice coil motor (VCM), shown generally at 22. Electronic circuitry, shown partially at 24, is used to direct power to the VCM 22 and transfer signals to and from the read/write heads 12 via a printed circuit cable (pcc) 26. Motion of the actuator body 18 about the pivot shaft 20 causes the heads 12 to move across the discs 6 along arcuate path 28 to access data located in any one of a plurality of circular, concentric data tracks (not shown) on the disc surfaces. A second pcc 30 carries the drive pulses to rotate the spindle motor. This second pcc 30 connects to a plurality of pins 32 in a header which passes through the base member 4, thus allowing external electronics (not shown) to control the spindle motor.

Figure 2:
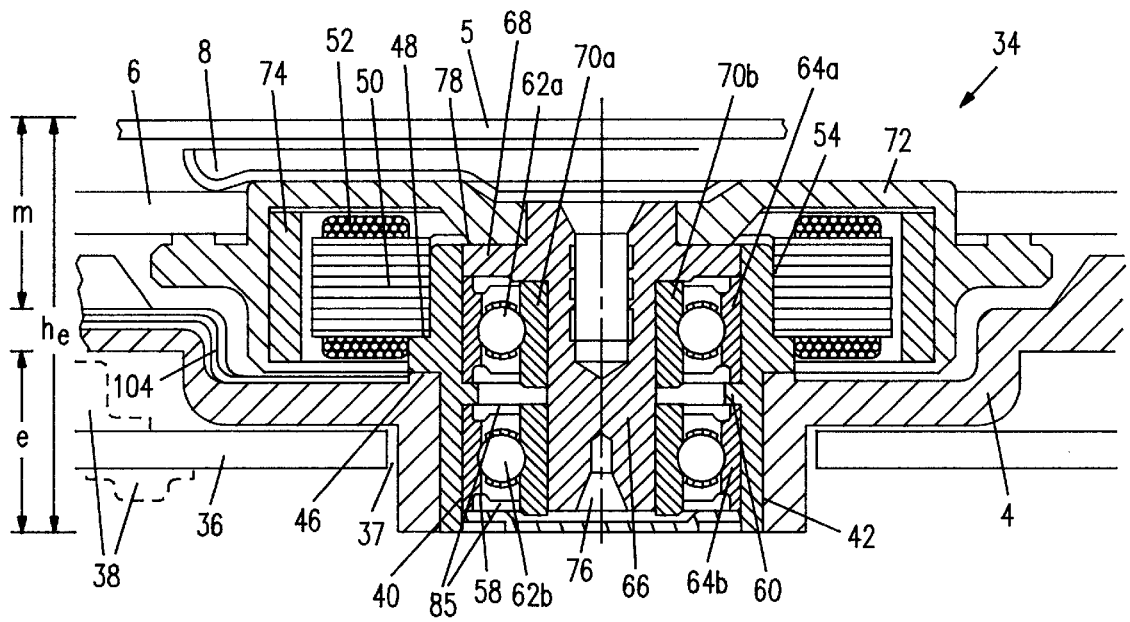
FIG. 2 is a sectional elevation view of a first embodiment of the spindle motor of the present invention.

FIG. 2 shows a sectional elevation view of one embodiment of the spindle motor 34 of the present invention. In this and subsequent figures, the embodiment shown is for a spindle motor which supports a single data storage disc, although comparable advantages can be realized in spindle motors used to rotate multiple discs. Several components of the disc drive which are not actually a part of the motor 34 of the present invention are shown in FIG. 2. For instance the base member 4, top cover 5, disc 6 and disc clamp 8 are shown as they relate to the motor 34. The dimension designated he denotes the total height allocated to the disc drive assembly, or envelope height, and extends from the top surface of the top cover 5 to the lowermost point on the base member 4. This envelope height, $h_e$, is one of the defined design parameters, and, in a particular disc drive unit in which the motor of the present invention has been implemented, is 12.5 mm. Two additional vertical dimensions are noted on FIG. 2. The dimension designated "m" is the height allowance for the mechanical components of the disc drive, such as the actuator, heads and discs, while the dimension designated "e" is the vertical space set aside for the electronic components of the disc drive, including a printed circuit board 36 and attached components 38.

As a first aspect of the invention, the motor 34 of the present invention includes a cylindrical sleeve 40 which serves to perform a variety of functions. First, the lower portion of the sleeve 40 acts as a mounting mechanism for attaching the motor 34 to the base member 4. This is accomplished by forming a complimentarily-shaped cylindrical opening 42 in the base member 4 into which the sleeve 40 can be either press-fitted or adhesively bonded. An opening 37 is also provided in the printed circuit board 36 to allow the passage of the sleeve 40 within the cylindrical opening 42. A lower stop surface 46 serves to contact the upper surface of the base member 4 and control how far the sleeve 40 can protrude into the opening 42. Such a scheme eliminates the mounting flange and fasteners commonly used to mount a spindle motor in a disc drive and thus serves to reduce the height of the motor 34. An upper stop surface 48 acts as a support for a stack of stator laminations 50 which in turn support a plurality of stator windings 52. This upper stop surface 48, in conjunction with the outer surface 54 of the sleeve 40 above the upper stop surface 48, serves to located the stator stack 50 both axially and radially. Commutated motor drive pulses are carried to the stator windings 52 via a printed circuit cable (pcc) 104. The connection of the pcc 104 to the stator windings 52 is another inventive aspect of the motor 34 of the present invention and will be further discussed below.

On the inner surface 58 of the sleeve 40 is a stepped portion 60 which is used to axially located a pair of ball bearings 62a, 62b via contact with the outer races 64a, 64b of the ball bearings 62a, 62b. The motor 34 further consists of a rotating shaft 66, which includes a flange portion 68 near its upper end. This flange portion 68 serves as a contact surface for the inner races 70a of the upper ball bearing 62a. Thus, when the sleeve 40, ball bearings 62a, 62b and shaft 66 are press-fitted or adhesively bonded together, the axial and radial alignment of the shaft 66 relative to the sleeve 40 is defined, as is the preload of the ball bearings 62a, 62b.

A hub member 72 is mounted to the top of the shaft 66. This hub member 72 is used to mount the disc 6, as well as to support a permanent magnet 74 which forms the rotor of the motor 34.

A seal 76 is included at the bottom of the motor 34 to prevent the entrance of any outside contaminants into the motor 34, which could then be possibly passed into the area of the heads (not shown) and disc 6. The seal comprises a sheet-metal plate glued to the outer races 64b of lower bearings 62b. This seal eliminates the need for a ferrofluid seal.

As a further contamination preventative, the air gap 78 between the cylindrical sleeve 40 and the shaft/hub subassembly 66/72 is intended to be as small as is reliably achievable using current mass production techniques. This will aid in isolating the delicate internal components of the disc drive from outside contaminants by creating a very small radially extending air gap portion between the lower surface of the flange portion 68 and the outer race 64a of the upper ball bearing assembly 62a and a second very small axially extending air gap portion between the outer extreme of the flange portion 68 and the inner surface 58 of the bearing sleeve 40. Such convoluted air passageways are sometimes referred to as "labyrinth seals".

Figure 3:
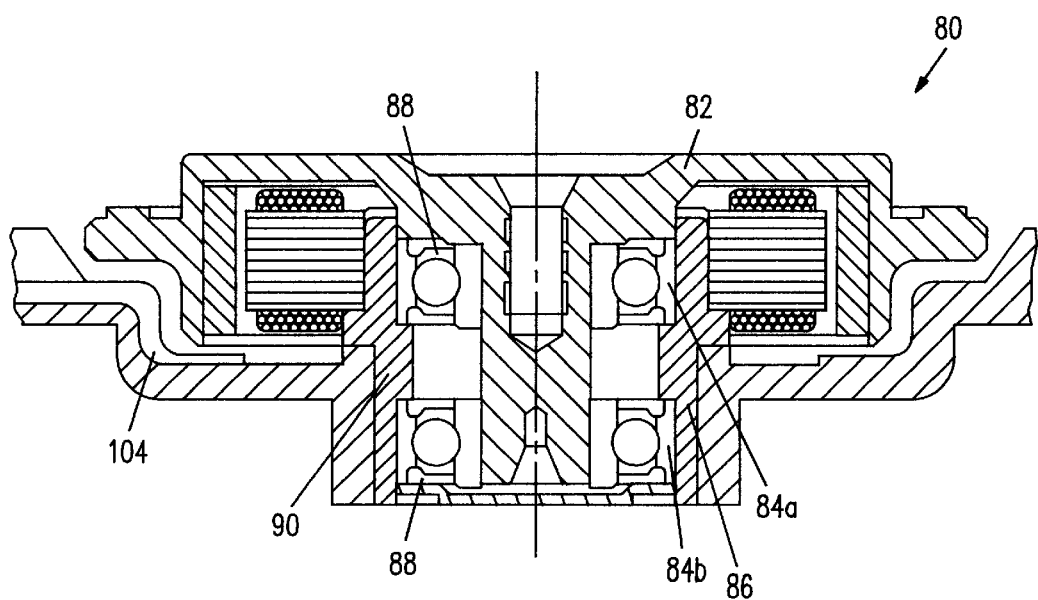
FIG. 3 is a sectional elevation view of a preferred embodiment of the spindle motor of the present invention.

FIG. 3 shows a sectional view of a preferred embodiment of the spindle motor 80 of the present invention. While the motor 80 of FIG. 3 is very similar to the motor 34 of FIG. 2, the motor 80 of FIG. 3 includes an integrated hub/shaft 82 formed of a single piece of material. This reduces the parts count and thus provides a motor which is less expensive and easier to assemble. A second major difference between the motor 80 of FIG. 3 and the motor 34 of FIG. 2 can be seen by comparing the pair of ball bearings 84a, 84b and the cylindrical sleeve 86 with similar components in FIG. 2.

The ball bearings 62a, 62b of FIG. 2 include a pair of seals 85 on both the upper and lower sides of the ball bearings 62a, 62b, while the ball bearings 84a, 84b of the motor 80 of FIG. 3 are specially made ball bearings with a sealing element 88 on only a single side of the ball bearings 84a, 84b. Including a sealing element 88 on the top surface of the upper ball bearing 84a and on the bottom surface of the lower ball bearing 84b provides the same effective sealing against particles generated in the ball bearings 84a, 84b themselves as does the double seal configuration of FIG. 2, and also provides a significant advantage over the double seal configuration. As can be seen by comparing FIGS. 2 and 3, the single seal bearings 84a, 84b have a much smaller vertical dimension. This allows the stepped portion 90 on the inner surface of the cylindrical sleeve 86 to be larger, separating the ball bearings 84a, 84b by a greater distance and contributing to an increase in the "stiffness" of the motor 80. Any particles generated within the ball bearings 84a, 84b are still confined within the sealed area defined by the integrated hub/shaft 82, the cylindrical sleeve 86 and the sealing elements 88.

Figure 4A:
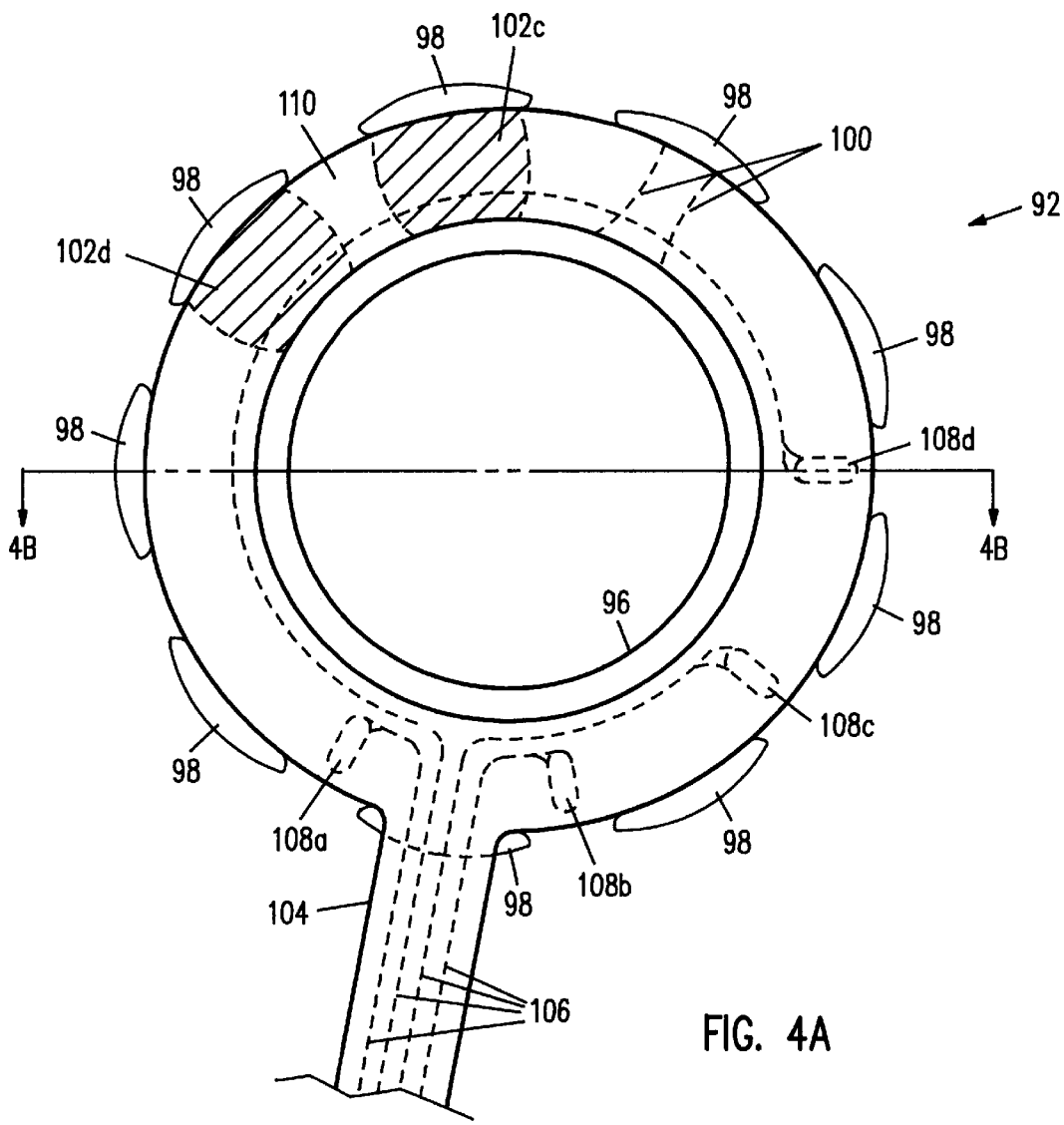
FIG. 4A is a bottom view of the stator and pcc sub-assembly of the spindle motor of the present invention.
Figure 4B:
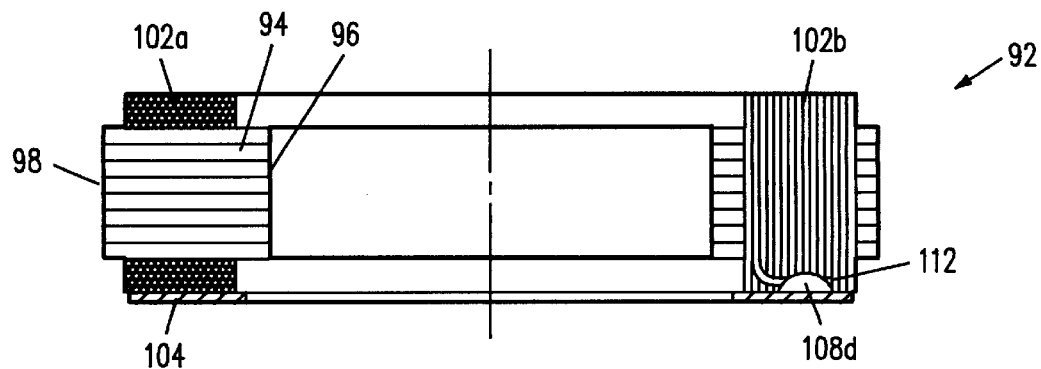
FIG. 4B is a partial sectional view taken along line 4A—4B of FIG. 4A.

Yet another aspect of the invention which contributes significantly to the reduction in the height of the motor can best be seen by examining FIGS. 4A and 4B. FIG. 4A is a bottom plan view of a stator subassembly 92, while FIG. 4B is a sectional view of the stator subassembly 92 taken along the line "4B—4B" of FIG. 4A. As can be seen, the stator subassembly 92 consists of a stack of stator laminations 94 which include a circular central opening 96 dimensioned to fit over the outside of the cylindrical sleeve (86 in FIG. 3) and a plurality of radially extending T-shaped stator poles 98, one of which is shown in its entirety with dashed line 100. Each of these stator poles 98 carries a stator winding 102a–102d comprised of a number of turns of wire. FIG. 4B shows one of these stator windings 102a in section and another stator winding 102b in elevation view, while shaded areas 102c and 102d show the general extent of an adjacent pair of stator windings in plan view. A flexible printed circuit cable (pcc) 104 is used to carry commutated DC drive pulses to the stator windings 102 via a plurality of signal traces 106. FIG. 4A shows that this example motor includes nine stator poles 98, but this is for example only and the present invention is in no way limited by the number of stator poles, number of electrical phases or other motor specifics. Each of the signal traces 106 ends in a solder pad 108a–d which is used to connect the signal traces 106 to the ends of the stator windings 102a–c. In the example motor of FIG. 4A, there are four signal traces 106 and a comparable number of solder pads 108a–d. Such a combination could be used, for instance, in a three-phase, star configured motor, with one of the pads serving as a common point for one end of all three phase windings, while the other three pads connect to the opposite end of each individual phase winding.

The inventive aspect under discussion can be understood by examining the pair of adjacent stator windings 102c, 102d in FIG. 4A. As this plan view shows, a vertically extending gap 110 is formed between each such pair of adjacent stator windings. The signal traces 106 and solder pads 108a–d on the pcc 104 are located on the top side of the pcc 104, i.e., on the side of the pcc 104 closest to the stator stack 94 and stator windings 102a–102d. In order to bring the pcc 104 into the closest possible contact with the stator stack 94, the solder pads 108a–d are each located in the vertically extending gap 110 between adjacent pairs of stator windings 102a–d. The advantage of this approach is best seen in FIG. 4B which shows the end 112 of the stator winding 102b connected to solder pad 108d. Since the solder pad 108d lies in the vertically extending gap 110 between adjacent stator windings, it can occupy the same vertical space as the stator winding 102b. If the solder pad 108d were not aligned with the vertically extending gap 110, or if the solder pad 108d were located on the other side of the pcc 104, a significantly taller structure would, of necessity, be formed.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

I claim:

1. A disc drive comprising:
   a base casting with a cylindrical bore extending between the inner and outer surfaces of the casting, the bore having a central axis and an interior surface facing the central axis, the inner end of the bore having a stop surface; and
   a spindle motor with a cylindrical bearing sleeve,
      the bearing sleeve having an outer surface and a first integral, intermediate flange extending outwardly from the outer surface and forming at least one abutting surface; said bearing sleeve mounted in said bore with said flange abutting surface abutting said bore stop surface and with said outer surface of said bearing sleeve between said flange and one end thereof contacting said interior surface of said bore; and
      the bearing sleeve having an inner surface and a second integral, intermediate flange extending inwardly from the inner surface and forming upper and lower bearing contact surfaces;
      the spindle motor including upper and lower ball bearing assemblies mounted within the bearing sleeve, with the outer races of the upper and lower bearing assemblies radially contacting the inner surface of the bearing sleeve and axially contacting the upper and lower bearing contact surfaces, respectively; and
      a shaft/hub assembly, supported by the inner races of the upper and lower ball bearing assemblies,
         the shaft/hub assembly including a radially extending flange portion having a lower surface in proximity to an upper surface of the outer race of the upper ball bearing assembly and having an outer surface in proximity to the inner surface of the bearing sleeve, so that a labyrinth seal is formed between said flange portion of said shaft/hub assembly and said outer race of said upper ball bearing assembly and said inner surface of said bearing sleeve.

2. A disc drive as claimed in claim 1 further including only two bearing seals,
   a first of the bearing seals sealing between the inner and outer races of the lower ball bearing assembly on that side of the lower ball bearing assembly opposite the lower bearing contact surface; and
   a second of the bearing seals sealing between the inner and outer races of the upper ball bearing assembly on that side of the upper ball bearing assembly opposite the upper bearing contact surface.

3. A disc drive as claimed in claim 1, the spindle motor further including:
   a central shaft fitted within the inner races of the ball bearing assemblies; and
   a disc mounting hub attached to the central shaft,
   the central shaft and disc mounting hub being formed from one contiguous piece of material.

4. The disc drive of claim 1 wherein the first integral, intermediate flange also forms a stator contact surface opposite said abutting surface;
   said spindle motor having a stator mounted on said bearing sleeve in contact with said outer surface and said stator contact surface;
   said stator having a plurality of radially extending stator poles supporting stator windings, adjacent pairs of windings defining gaps therebetween;
   a flexible printed circuit cable located radially outward of said first flange, and in close proximity to said windings;
   said flexible printed circuit cable having a plurality of bonding pads radially aligned with said gaps and located within the radial and axial extent of said windings; and
   said stator windings having terminating ends connected to said bonding pads.

5. A disc drive comprising:
   a spindle motor with a cylindrical bearing sleeve;
      the bearing sleeve having an outer surface and an integral, intermediate flange extending outwardly from the outer surface and forming a stator contact surface;
      said spindle motor having a stator mounted on said bearing sleeve in contact with said outer surface and said stator contact surface;
      said stator having a plurality of radially extending stator poles supporting stator windings, adjacent pairs of windings defining gaps therebetween;
      a flexible printed circuit cable located radially outward of said flange, and in close proximity to said windings;
      said flexible printed circuit cable having a plurality of bonding pads radially aligned with said gaps and located within the radial extent of said windings and below the top of said stator poles; and
      said stator windings having terminating ends connected to said bonding pads.

* * * * *